INVENTORS
Harry A. Knox
Bert F. Baker
BY
W. N. Roach ATTORNEY

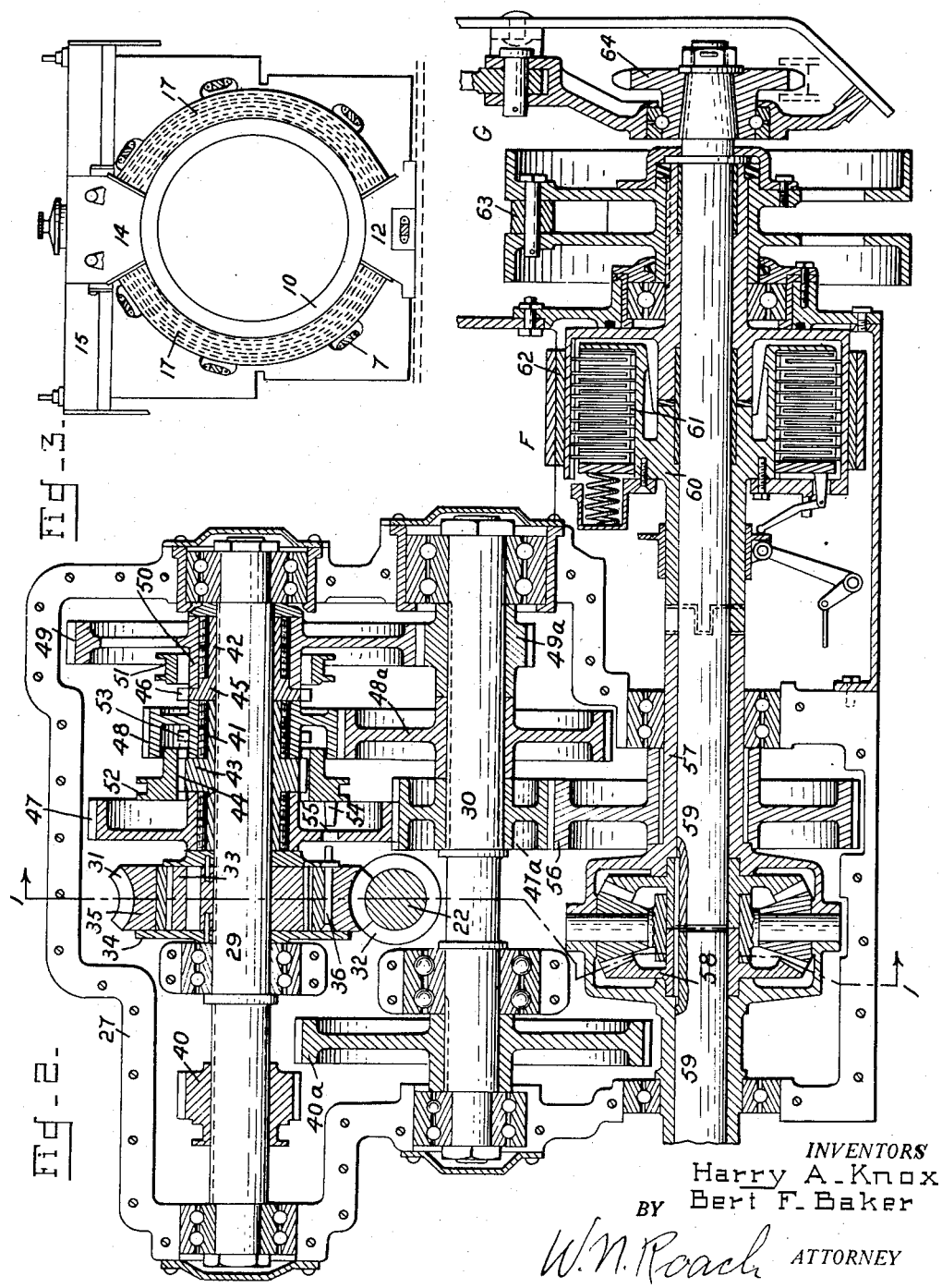

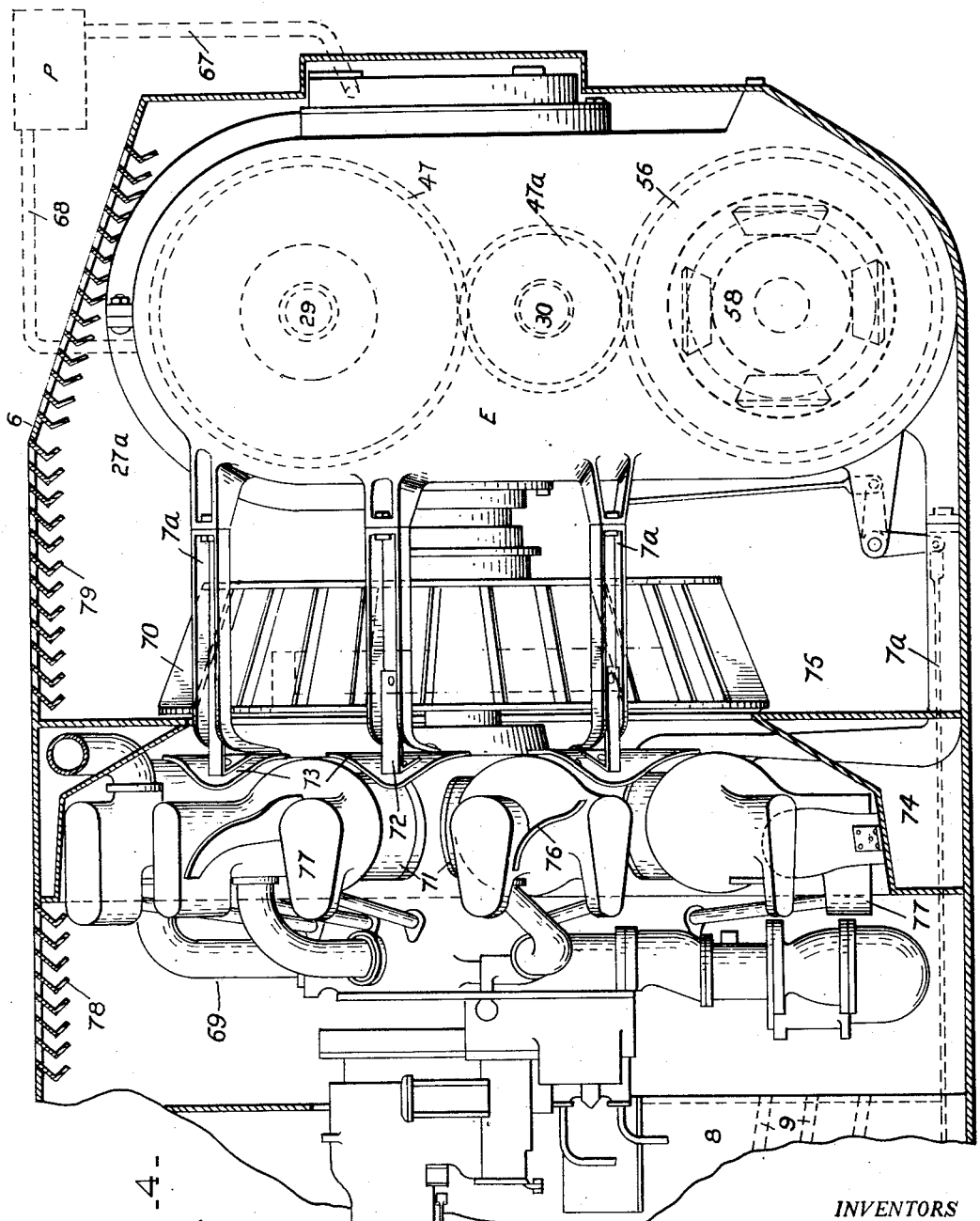

Patented July 25, 1933

1,919,227

UNITED STATES PATENT OFFICE

HARRY A. KNOX AND BERT F. BAKER, OF DAVENPORT, IOWA

POWER PLANT

Application filed October 21, 1931. Serial No. 570,140.

(GRANTED UNDER THE ACT OF MARCH 3, 1883, AS AMENDED APRIL 30, 1928; 370 O. G. 757)

The invention described herein may be manufactured and used by or for the Government, for governmental purposes, without the payment to us of any royalty thereon.

The subject of this invention is a power plant especially adapted for vehicles.

The principal object of the invention is to provide a power plant in which the motor, cooling system, clutch, change speed transmission mechanism, and power communications are all arranged in a compact assembly capable of being positioned in proximity to the final drive members.

In addition to the novel grouping the invention is characterized by a fan including a flywheel and a master clutch element, an over-running clutch in the main worm drive to render free wheeling available for all speeds, a novel arrangement of the countershafts of the transmission mechanism to provide constant mesh gears with a common final drive gear, and a novel method of coupling one of the gears of the transmission direct with the main worm wheel to selectively eliminate free wheeling through said gear.

With the foregoing and other objects in view, the invention resides in the novel arrangement and combination of parts and in the details of construction hereinafter described and claimed, it being understood that changes in the precise embodiment of the invention herein disclosed may be made within the scope of what is claimed without departing from the spirit of the invention.

A practical embodiment of the invention is illustrated in the accompanying drawings wherein:

Fig. 2 is a sectional view on the line 2—2 of Fig. 1.

Fig. 3 is a detail view in front elevation of the radiator of the cooling system.

Fig. 4 is a view in side elevation and partly in section of an air cooled motor.

Figure 1:
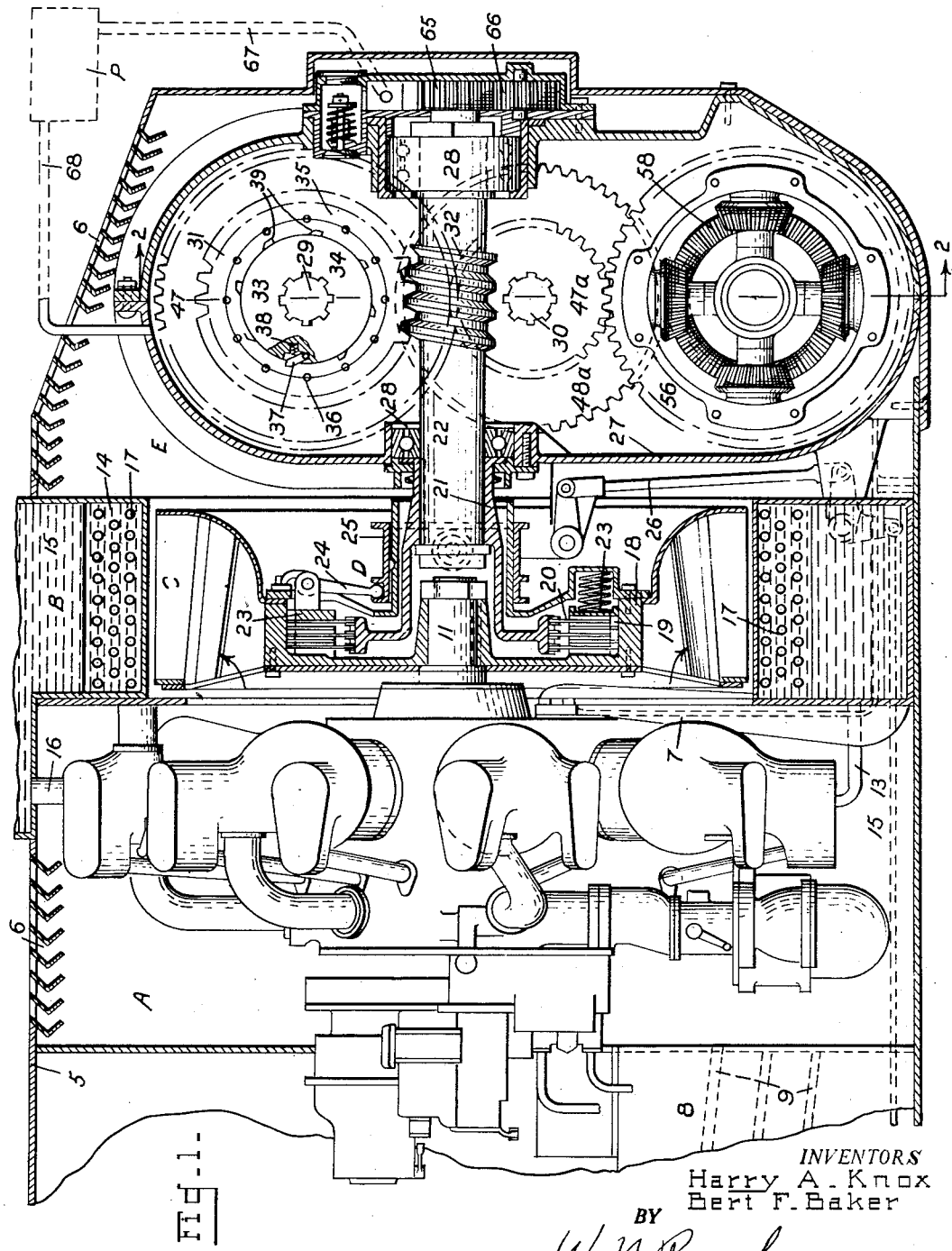
Fig. 1 is a view on the line 1—1 of Fig. 2 partly in elevation and partly in longitudinal section of a power plant constructed in accordance with the invention.

Referring to the drawings by characters of reference:

The power plant consists of the following units: motor A, radiator B, fan C, master clutch D, change speed transmission mechanism E, steering clutches F and final drive G. In the illustrated application of the invention the power plant is positioned in the rear end of an armored body 5 of a track-laying vehicle. The body is provided at appropriate points with apertures 6 for the passage of air.

The motor A is of the radial type and is supported in a vertical position by means of a plurality of arms 7 extending from the casing 27 of the mechanism E and disposed around the annular radiator B (Fig. 3). The oil reservoir 8 for the motor is placed on the floor of the body in front of the motor and is traversed by a series of tubes 9 through which air may pass.

The radiator B (Fig. 3) is directly in rear of the motor and comprises an annular casing 10 practically as large as the radial motor and embracing the projecting crankshaft 11. The casing includes a bottom header 12 having a return line 13 and an upper header 14 associated with a reservoir 15 having an outlet line 16. Tubes 17 establish communication between the headers. For the sake of clarity the circulating pump is not shown.

The fan C and master clutch D are mounted within the annular casing 10 of the radiator. The hub of the fan constitutes a flywheel 18 fast on the crankshaft 11 and carries one set of discs 19 of the master clutch D. The other set of discs 20 are on the driven member 21 fast on the transmission shaft 22. The pressure plate 23 of the clutch carries a lever 24 engaged in a sliding collar 25 that is actuated by a control system of levers and links 26. The control system is mounted on the front wall of the casing 27 of the transmission mechanism E which is positioned directly in rear of the fan. By virtue of this arrangement the transmission shaft 22 is short enough to avoid the use of universal connections. It is entirely supported in bearings 28—28 in the front and rear walls of the casing 27.

Referring to Fig. 2 the change speed transmission mechanism E includes vertically spaced countershafts 29 and 30, the former being above the transmission shaft 22 and the latter below it. The upper primary countershaft carries a worm wheel 31 meshing with the worm 32 on the transmission shaft. The worm wheel consists of an inner ring 33 splined on the countershaft and an outer ring comprising concentric bands, the inner band 34 being of steel and the outer bands 35 being of bronze and formed with the worm teeth. The two bands are held together by a plurality of pins 36. The coupling between the inner and outer rings is of the overrunning clutch type, and is preferably positive consisting of pawls 37 on the inner ring normally urged outwardly by springs 38 to engage ratchet teeth 39 on the inner band.

On one side of the worm wheel 31 is a sliding gear 40 for first speed. A reverse mechanism of conventional type is associated with the sliding gear but for the sake of clarity is not shown in the drawings.

On the other side of the worm wheel 31 a pair of sleeves 41 and 42 are splined on the countershaft. The inside sleeve 41 adjacent the worm wheel is formed with a central annular rib 43 having teeth 44. The outside sleeve 42 has a similar rib 45 at its inner end provided with teeth 46. Gear wheels 47, 48, and 49 are mounted on bearings on the sleeves and are separated by the ribs. The gear 47 is for third speed, the gear 48 for second speed and the gear 49 for fourth speed. The gear 49 has teeth 50 on its hub and a clutch collar 51 engaged therewith is slidable into and out of engagement with the teeth 46 of the rib 45.

A clutch collar 52 on the rib 43 is engageable with teeth 53 on the hub of the gear 48. The clutch collar 52 is also provided with one or more laterally projecting teeth 54, movable into and out of apertures 55 in the gear 47. As indicated in dotted lines in Fig. 2 the teeth 54 may engage only the gear 47 or they may be moved further to the left to engage between the pins 36 and thereby couple the gear 47 directly to the outer ring of the worm wheel 31. This last position of adjustment will cut out the overrunning element of the worm wheel and enable the braking action of the motor to be employed when desired.

The gear wheels 40, 47, 48, and 49 mesh with mating gear wheels 40a, 47a, 48a, and 49a on the lower or second countershaft 30, all except the gear 40 being in constant mesh. The drive is taken through the gear wheel 47a to a gear wheel 56 fast on one side of the housing 57 of a differential gear mechanism. The bevel gears 58—58 of the differential are fast on the divided drive shafts 59—59. The housing 57 is coupled at each side to a sleeve 60 embracing the drive shaft. The sleeve carries one element 61 of the steering clutch F while the other element 62 of the clutch is likewise on a sleeve extending outside the body 5 and terminally carrying a track-driving sprocket wheel 63. The shaft 59 extends beyond the sprocket wheel and carries a smaller sprocket wheel 64.

The rear end of the transmission shaft carries a gear 65 meshing with a gear 66. These gears cooperate to provide a pump for delivering fluid through the line 67 to a power actuator P which is to be associated with the steering apparatus and brake mechanisms in a well known manner. A line 68 from the actuator to the casing returns the fluid.

In Fig. 4, the invention is illustrated in connection with an air cooled motor 69, the radiator B of Fig. 1 being omitted. The arms 7a corresponding to the arms 7 of Figs. 1 and 3 and serving to support the motor from the transmission casing 27a, extend across the fan 70 at a point between the cylinders 71 of the motor. A bracket 72 on each arm carries a curved baffle plate 73 which is adapted to direct air against the rear portions of adjoining cylinders.

A cowl 74 encircling the motor and spaced therefrom includes a rear tapered portion 75 terminating adjacent the leading edge of the fan 70. A small baffle plate 76 is provided for each cylinder and is attached to the cowl so that it will deflect air against the exhaust valve housing 77.

When the motor is in operation, the fan draws air through the front louvres 78 and passes it out through the rear louvres 79. The cowl confines the air to the space immediately surrounding the motor and the baffles 76 and 73 respectively deflect the air to the exhaust valve housing 77 and to the rear walls of the cylinders.

We claim:

1. A power plant including a motor, a flywheel for the motor including an element of a clutch and a fan, a radiator encircling the fan, a change speed transmission casing adjoining the fan, a transmission shaft including a worm mounted in the casing, an element of a clutch on the shaft cooperating with the first named clutch element, transverse countershafts in the casing, one above and one below the shaft, a worm wheel including an overrunning clutch on the upper shaft and meshing with the worm, change speed gears on the countershafts, and a final drive unit directly below the lower countershaft.

2. A power plant including a motor, a flywheel for the motor including an element of a clutch and a fan, a radiator encircling the fan, a change speed transmission casing adjoining the fan, a transmission shaft mounted in the casing, an element of a clutch on the shaft cooperating with the first named clutch element, transverse countershafts in the casing, one above and one below the shaft, gearing including an overrunning clutch connecting the transmission shaft and upper countershaft, change speed gears on the countershafts, and a final drive unit directly below the lower countershaft.

3. A power plant including a motor, a flywheel for the motor including an element of a clutch and a fan, a radiator encircling the fan, a change speed transmission casing adjoining the fan, a transmission shaft mounted in the casing, an element of a clutch on the shaft cooperating with the first named clutch element, transverse countershafts in the casing, one above and one below the shaft, gearing connecting the transmission shaft and upper countershaft, change speed gears on the countershafts, and a final drive unit directly below the lower countershaft.

4. A power plant including a motor, a flywheel for the motor including an element of a clutch and a fan, a radiator encircling the fan, a change speed transmission casing adjoining the fan, a transmission shaft mounted in the casing, an element of a clutch on the shaft cooperating with the first named clutch element, countershafts and final drive shafts arranged in a vertical plane transversely of the transmission shaft, and gearing connecting the transmission shaft and one of the countershafts.

5. A power plant including a motor, a flywheel for the motor including an element of a clutch and a fan, a radiator encircling the fan, a change speed transmission casing adjoining the fan, a transmission shaft mounted in the casing, an element of a clutch on the shaft cooperating with the first named clutch element, countershafts arranged in a vertical plane transversely of the transmission shaft, and gearing connecting the transmission shaft and one of the countershafts.

6. A power plant including a motor, a flywheel for the motor including an element of a clutch and a fan, a radiator encircling the fan, a change speed transmission casing adjoining the fan, a transmission shaft mounted in the casing, and an element of a clutch on the shaft cooperating with the first named clutch element.

7. A power plant including a change speed transmission and casing therefor, a motor, a plurality of arms extending from the casing and supporting the motor, a power transmission including a clutch connecting the motor and change speed transmission and a fan associated with said power transmission and disposed within the arms.

8. A power plant including a change speed transmission and casing therefor, a motor, a plurality of arms extending from the casing and supporting the motor, and a power transmission including a clutch connecting the motor and change speed transmission.

9. A power plant including a multi-cylinder motor, a fan adjoining the motor for drawing air over the motor, a cowl encircling the motor and having a tapered portion extending to the leading edge of the fan, baffle plates in rear of and between the cylinders of the motor, and a baffle plate at the outer end of each cylinder.

10. A power plant including a multi-cylinder motor, a fan adjoining the motor for drawing air over the motor, a cowl encircling the motor and having a tapered portion extending to the leading edge of the fan, and baffle plates in rear of and between the cylinders of the motor.

HARRY A. KNOX.
BERT F. BAKER.